(12) United States Patent
Schuck

(10) Patent No.: US 9,110,368 B2
(45) Date of Patent: Aug. 18, 2015

(54) ANAMORPHIC STEREOSCOPIC OPTICAL APPARATUS AND RELATED METHODS

(75) Inventor: Miller H. Schuck, Erie, CO (US)

(73) Assignee: RealD Inc., Beverly Hills, CA (US)

( * ) Notice: Subject to any disclaimer, the term of this patent is extended or adjusted under 35 U.S.C. 154(b) by 500 days.

(21) Appl. No.: 13/525,609

(22) Filed: Jun. 18, 2012

(65) Prior Publication Data
US 2012/0320165 A1 Dec. 20, 2012

Related U.S. Application Data

(60) Provisional application No. 61/497,892, filed on Jun. 16, 2011.

(51) Int. Cl.
*H04N 13/02* (2006.01)
*G03B 35/10* (2006.01)
*G03B 35/22* (2006.01)

(52) U.S. Cl.
CPC .............. *G03B 35/10* (2013.01); *G03B 35/22* (2013.01)

(58) Field of Classification Search
CPC .................................. G03B 35/22; G03B 35/10
USPC ................ 348/49, 51, 46, 54; 349/9, 8; 353/8
See application file for complete search history.

(56) References Cited

U.S. PATENT DOCUMENTS

| | | | | |
|---|---|---|---|---|
| 5,835,133 A | * | 11/1998 | Moreton et al. | 348/49 |
| 6,002,519 A | * | 12/1999 | Hayashi et al. | 359/557 |
| 6,546,208 B1 | * | 4/2003 | Costales | 396/324 |
| 6,683,716 B1 | * | 1/2004 | Costales | 359/465 |
| 2003/0156187 A1 | * | 8/2003 | Gluckman et al. | 348/46 |
| 2005/0286136 A1 | * | 12/2005 | Masubuchi et al. | 359/651 |
| 2008/0225236 A1 | * | 9/2008 | Schuck et al. | 353/20 |
| 2009/0128780 A1 | * | 5/2009 | Schuck et al. | 353/20 |
| 2010/0141856 A1 | * | 6/2010 | Schuck et al. | 349/9 |
| 2011/0058240 A1 | * | 3/2011 | Dell'Eva et al. | 359/23 |
| 2011/0164311 A1 | * | 7/2011 | Morikuni | 359/364 |

OTHER PUBLICATIONS

Gluckman, J. & Nayar, S., Rectified Catadioptric Stereo Sensors, IEEEE Transactions on Pattern Analysis and Machine Intelligence, vol. 24, No. 2, Feb. 2002.

* cited by examiner

*Primary Examiner* — Christopher S Kelley
*Assistant Examiner* — Zhihan Zhou
(74) *Attorney, Agent, or Firm* — Darlene K. Kondo; Neil G. Mothew

(57) ABSTRACT

Disclosed herein are apparatuses and methods for reclaiming the full field of view (FOV) of the original camera lens in a stereoscopic image capture system using an anamorphic attachment. Also disclosed are apparatuses and methods of projecting stereoscopic images on a fixed size screen from a single projector that was initially designed primarily for 2D operation. An exemplary apparatus may comprise an anamorphic afocal converter configured to halve a FOV of a camera or projector into two optical paths, and convert the halved FOVs into two full FOVs of the camera or projector. Such an apparatus may further comprise reflecting elements cooperatively arranged to direct two rectified images at a camera sensor or projection screen, where one or more reflecting elements receive the first of the two full FOVs and one or more reflecting elements receive the second of the two full FOVs.

22 Claims, 3 Drawing Sheets

ANAMORPHIC STEREOSCOPIC OPTICAL APPARATUS AND RELATED METHODS

CROSS-REFERENCE TO RELATED APPLICATIONS

The present application is a non-provisional utility patent application of and claims priority to U.S. Provisional Patent Application No. 61/497,892, filed Jun. 16, 2011, entitled "Anamorphic Stereoscopic Lens," which is herein incorporated by reference in its entirety. Since the twelve month anniversary for filing a non-provisional utility application under 35 U.S.C. 111(b) falls on Saturday, Jun. 16, 2012, this application is timely filed on the succeeding business day, Monday Jun. 18, 2012, in accordance with 35 U.S.C. 21.

TECHNICAL FIELD

The present disclosure generally relates to lenses for stereoscopic image capture and projection, and more specifically relates to anamorphic stereoscopic lenses.

BACKGROUND

Stereoscopic image capture involves recording two images of the same scene from slightly different perspectives. One technique to accomplish this is to use two cameras, physically offset from one another, to record the scene. Another technique is to use two lenses on a single camera that are physically offset from one another, and record two separate images on a large film or imaging sensor.

Likewise, stereoscopic projection can utilize two projectors to present left and right eye images at a single screen. The projectors are physically offset from one another and the projector lenses are shifted with respect to the spatial light modulator (or panel) to overlay the images on a single screen. Alternatively, a single projector with a large panel may be utilized with two projection lenses, which are offset from one another. Typically, a relay lens and splitting prisms are inserted between the panel and projection lenses to allow space for shifting the projection lenses such that the images overlay.

Known catadioptric systems (i.e., mirror and lens systems) can capture stereo images with a single camera detector and a single lens. See, e.g., J. Gluckman & S. Nayar, *Rectified Catadioptric Stereo Sensors*, IEEE Transactions on Pattern Analysis and Machine Intelligence, Vol. 24, No. 2, February 2002, herein incorporated by reference. For rectified imagery at the sensor over a common field of view, Gluckman and Nayar show a compact stereoscopic capture system with three mirrors and a single camera. Left and right eye images are considered rectified if their epipolar lines are aligned with the rows or columns of the sensor array. The resulting field of view (FOV) of the camera is halved in the direction of the plane containing the normals of the mirrors.

FIG. 1 is a schematic diagram of a known stereoscopic image capture system 100, which is presented in the Gluckman & Nayar reference introduced above. A single camera and capture lens 110 is with this type of stereoscopic image capture system, as explained above. Planar mirrors labeled "M1", "M2" and "M3" are included in the stereoscopic image capture system 100 illustrated in FIG. 1. If the camera sensor has pixel rows or columns that are parallel to the plane containing the normals of the mirrors, then the two images at the sensor are rectified. As illustrated, "FOV" describes the original angular field of view of the camera (in the plane of the paper). "FOV/2" depicts the common field of view of the two optical paths, which unfortunately is only half the size of the original field of view (FOV). What is needed in the art is a technique for reclaiming the full FOV of the original camera lens, thus overcoming the deficiencies of the above-mentioned conventional approach.

BRIEF SUMMARY

The present disclosure generally relates to lenses for stereoscopic image capture and projection, and more specifically relates to anamorphic stereoscopic lenses. In one aspect, optical apparatuses for converting a camera or projector to a stereoscopic image capture or projection system are provided. In one embodiment, such an optical apparatus may comprise an anamorphic afocal converter configured to halve a field of view of a camera or projector into two optical paths, and convert the halved fields of view into two full fields of view of the camera or projector. In addition, such an optical apparatus may further comprise a plurality of reflecting elements cooperatively arranged to direct two rectified images at a camera sensor or projection screen. In such embodiments, one or more of the plurality of reflecting elements receive the first of the two full fields of view and one or more of the plurality of reflecting elements receive the second of the two full fields of view. In addition, the anamorphic afocal converter is located between the camera or projector and the plurality of reflecting elements.

In related embodiments, the optical apparatus may further comprise a prism operable to redirect the axial rays of the two optical paths to be substantially parallel to the optical axis of the camera or projector. Moreover, the optical apparatus may comprise first and second filters inserted into each optical path for encoding left and right eye stereoscopic images, wherein the filter functions are orthogonal to one another and the filter locations are selected such that each filter only sees one pass of light from one of the optical paths. In some embodiments, the optical path lengths for the two optical paths are matched. In other embodiments, the optical apparatus may include a weak afocal converter inserted in one optical path to correct magnification differences in the images produced by the two fields of view, wherein the optical path lengths for the two optical paths are unmatched. Still further, the optical apparatus may further comprise a relay lens and a short back focal length projection lens having an exit pupil proximate to the anamorphic afocal converter.

In another aspect, methods of converting a camera or projector to a stereoscopic image capture or projection system are provided herein. In one embodiment, such a method may comprise halving a field of view of a camera or projector into two optical paths. In addition, such a method may further comprise converting the halved fields of view into two full fields of view of the camera or projector. Then such a method may comprise directing two rectified images at a camera sensor or projection screen using a plurality of reflecting elements, wherein one or more of the plurality of reflecting elements receive the first of the two full fields of view and one or more of the plurality of reflecting elements receive the second of the two full fields of view.

In some embodiments, disclosed methods may further comprise redirecting the axial rays of the two optical paths to be substantially parallel to the optical axis of the camera or projector. In other embodiments, the method may further include inserting first and second filters into each optical path for encoding left and right eye stereoscopic images, wherein the filter functions are orthogonal to one another and the filter locations are selected such that each filter only sees one pass of light from one of the optical paths. In other embodiments, the optical path lengths for the two optical paths are matched, while in still further embodiments, the method may further comprise correcting magnification differences in the images produced by the two fields of view, wherein the optical path lengths for the two optical paths are unmatched.

DETAILED DESCRIPTION

This disclosure provides an apparatus and method for reclaiming the full field of view (FOV) of the original camera lens in a stereoscopic image capture system using an anamorphic attachment. Also disclosed is a method and apparatus of projecting stereoscopic images on a fixed size screen from a single projector that was initially designed primarily for 2D operation.

Figure 1:
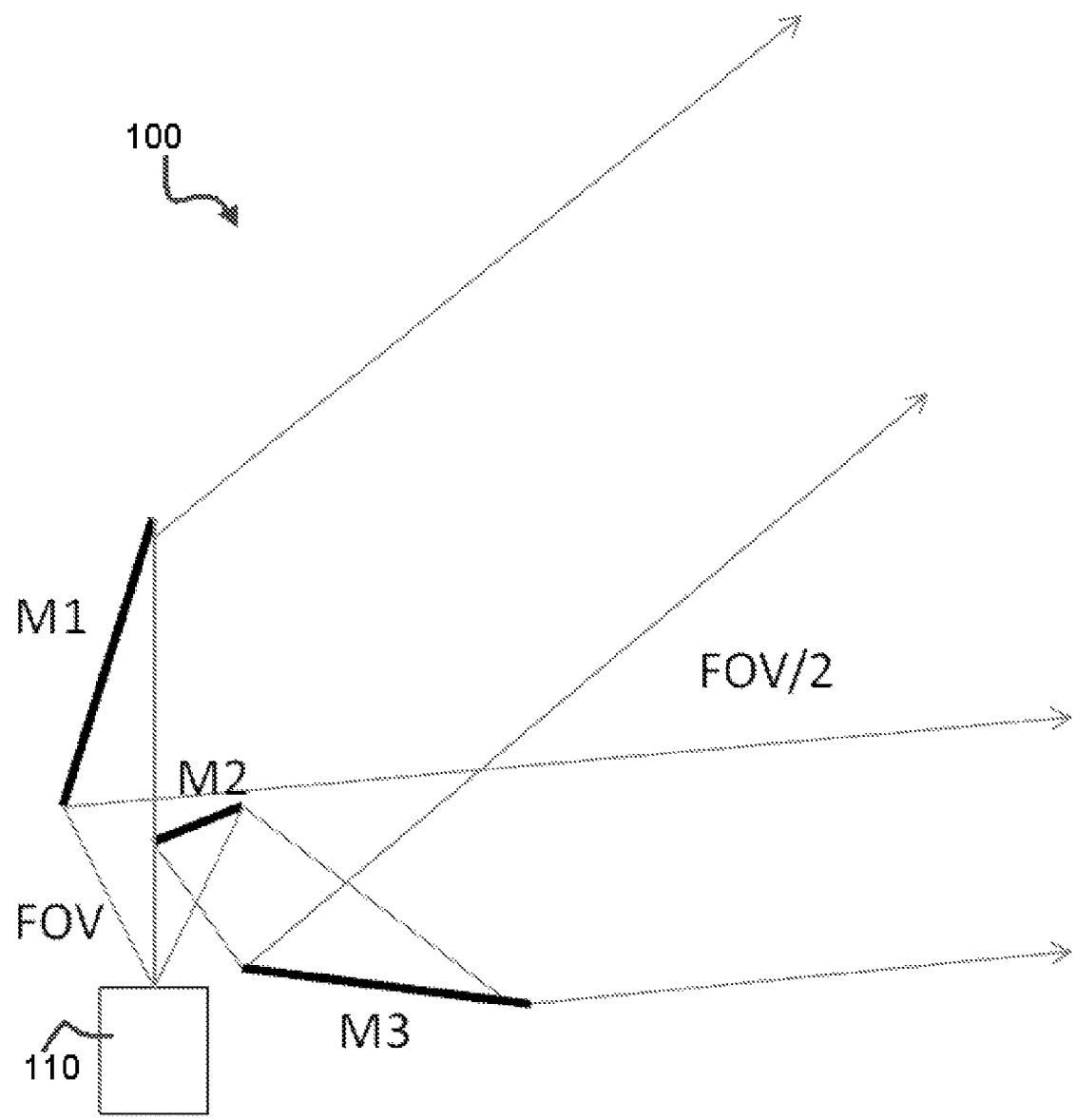
FIG. 1 is a schematic diagram of a known stereoscopic image capture system.
Figure 2:
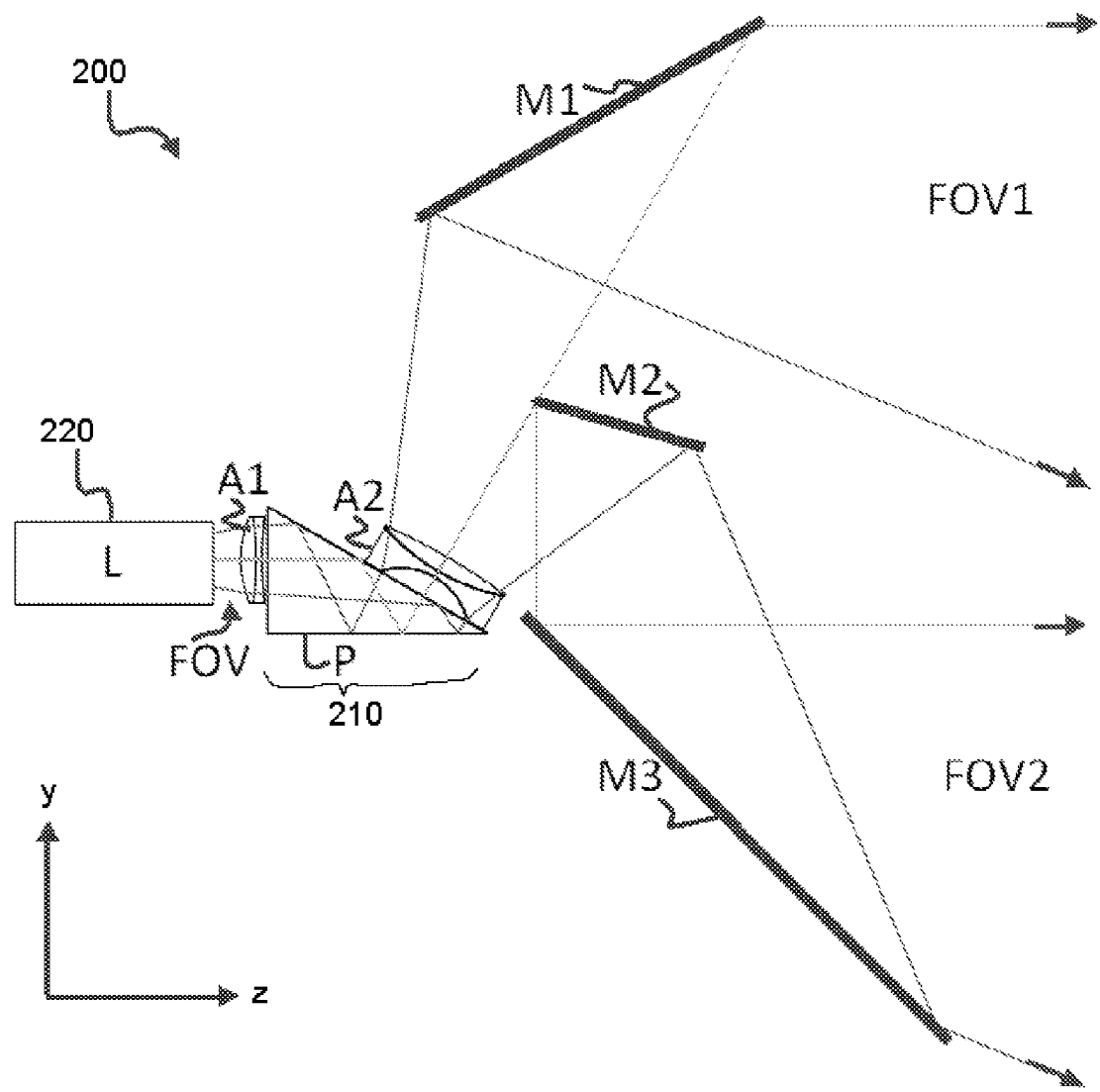
FIG. 2 is a schematic diagram illustrating an anamorphic catadioptric lens apparatus for creating stereoscopic images (in capture or projection) with a single camera or projector, in accordance with the present disclosure.

FIG. 2 is a schematic diagram illustrating a stereoscopic system 200 constructed in accordance with the present disclosure. The system 200 includes an anamorphic catadioptric attachment 210 for a lens 220 for creating stereoscopic images (in capture or projection) with a single camera or projector (not illustrated). In accordance with the present disclosure, the arrangement of mirrors (M1, M2, M3) shown in FIG. 1 may be modified to utilize an anamorphic afocal converter (comprised of first and second lenses A1, A2, and a prism P) on the optical path between the lens 220 and mirrors M1, M2, M3.

An anamorphic system has power in one plane (in this case, the plane of the paper) and little or no power in the orthogonal plane. Its elements are typically cylindrical, although spherical elements may be added to control astigmatism. Generally, an afocal system does not focus collimated rays, but can change the angle of incidence of a collimated ray bundle. In accordance with the present disclosure, the anamorphic afocal converter 210 may be used to double the size of the halved FOV in each of the illustrated upper and lower optical paths from the lens 220 (i.e., the size of FOV, FOV1, and FOV2 in the diagram are equal) by selecting an anamorphic magnification of 2× in the plane of the paper (or "tangential" plane). Stated another way, the FOV from the lens 220 is halved upon passing through the anamorphic afocal converter 210; however, the converter 210 also magnifies the halved FOVs by a magnitude of 2×. The reflecting elements M1, M2, M3 are then arranged so as to provide both FOV1 and FOV2 equal to the FOV from the lens 210. As a result, the entire original FOV of the lens 210 is recaptured as two distinct FOVs (i.e., FOV1 and FOV2), which can in turn be differentially filtered (at any of various locations along each optical path, as described below) to capture/provide a stereoscopic image. To preserve the field of view in the plane normal to the paper ("sagittal" plane), an anamorphic magnification of 1× may be selected for the afocal converter in the sagittal plane.

The anamorphic magnification of 2× in the vertical ("y") direction reduces the resolution of the data at the sensor/panel to half the resolution of the 2D case. In the image capture case, the captured data should be scaled vertically by 2× for the resulting image to have the proper aspect ratios. In the projection case, the data sent to the panel should be scaled vertically by 0.5× for the resulting image at the screen to have the proper aspect ratios. The attachment may be used with side-by-side format systems, or with over-under format systems.

Looking specifically at the anamorphic afocal converter 210, lenses A1 and A2 may be comprised of a convex and concave lens, respectively, as illustrated. More specifically, lenses A1 and A2 in the illustrated embodiment are implemented as cylindrical doublets, e.g., a combination of a crown and a flint. Regardless of their specific shape, the lenses A1 and A2 are configured in accordance with the disclosed principles to reduce axial, lateral and chromatic aberrations of the lens 220 output. A prism (P) is also included in the embodiment shown in FIG. 2. The prism is operable to redirect the optical axis from the lens 220 such that the lens 220 optical axis and axial rays of FOV1 and FOV2 are substantially parallel. This is particularly convenient in the projection case, where the projector's optical axis is substantially parallel (or close to parallel) to the screen normal. The particular prism configuration illustrated in FIG. 2 may be selected to accommodate screens that are offset from the projector by around 50% of the screen's height.

For overlay of the two images on a screen at a finite distance from the projector, M1, M2 and/or M3 may be tilted about a normal to the plane of the paper to adjust one or both image locations on screen. Additionally, the projector may be tilted about a normal to the paper plane in combination with mirror tilt to assist overlay.

The lengths of the optical paths from element A2 to M1 and A2 to M3 have been matched in FIG. 2 to match the image sizes at the camera sensor or projection screen. However, unmatched optical paths may also be implemented for a more compact system by inserting a weak spherical afocal converter (a positive and a negative lens separated by air) in one of the paths. The weak afocal converter's magnification can then be adjusted to null the image magnification difference resulting from unmatched optical paths.

For 2D operation of the camera or projector, the attachment may be removed from the optical path. For 3D operation, the attachment may be placed in the optical path of the lens 220. In the projection case, the projection lens may use a vertical shift to place the two images at the fixed screen location.

Filters for creating stereoscopic encoding of the left and right images (e.g., linear polarizers, circular polarizers including a linear polarizer and quarter-wave retarder, or dielectric stacks for selecting different spectral bands) may be placed in the optical path. Locations include the space between L and A1, between A1 and P, between P and A2, between A2 and M1 and A2 and M2, between A2 and M1 and M2 and M3, after M1 and M3, or any combination of those locations as long as one path is encoded orthogonally to the other path and the filter location allows only one pass of light from one path through it.

Figure 3:
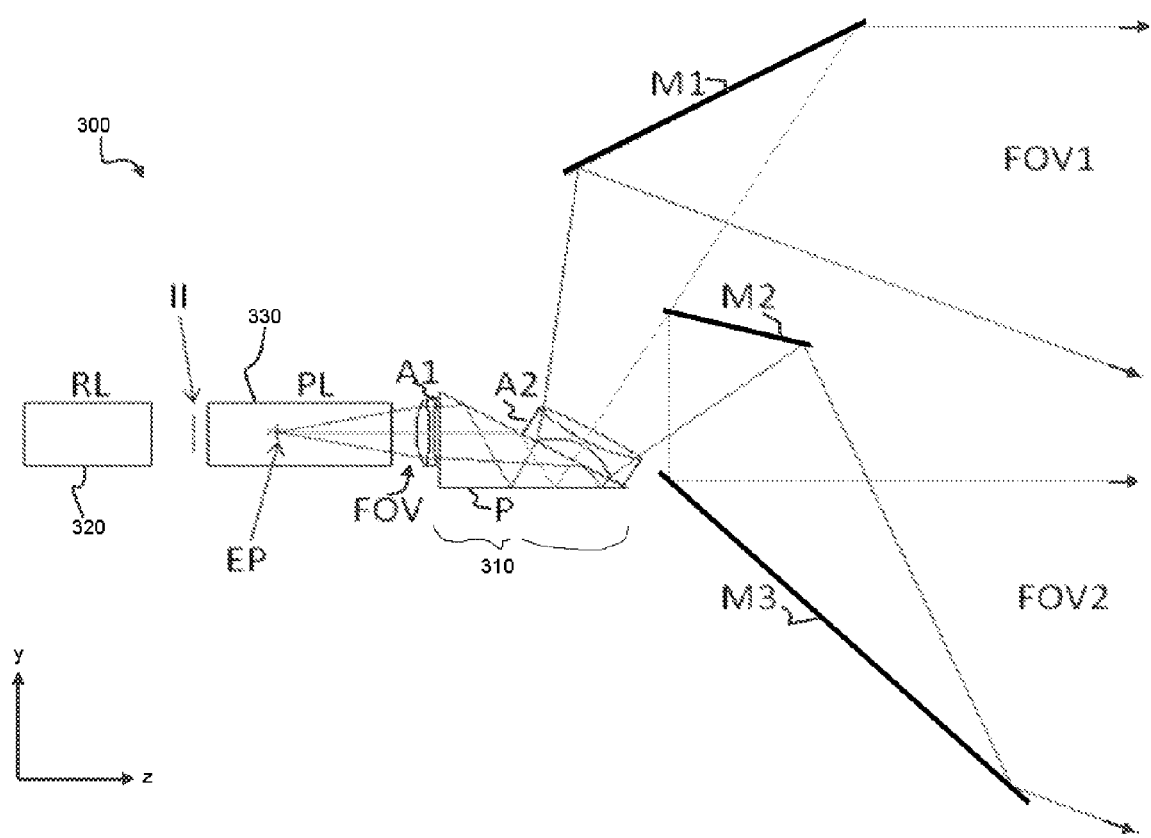
FIG. 3 is a schematic diagram illustrating another anamorphic catadioptric lens apparatus for creating stereoscopic images (in capture or projection) with a single camera or projector, in accordance with the present disclosure.

FIG. 3 is a schematic diagram illustrating another image system 300, which includes another embodiment of an anamorphic catadioptric lens apparatus 310 for creating stereoscopic images (in capture or projection) with a single camera or projector (not illustrates). As with the embodiment illustrated in FIG. 2, the anamorphic lens apparatus 310 of FIG. 3 may again include first and second lenses A1 and A2 (e.g., implemented as lens doublets, as illustrated), as well as a prism P. For compactness, the apparatus 310 shown in FIG. 3 may be implemented in combination with a relay lens 320 and a projection lens 330 in place of a projection lens alone as was the case in FIG. 2. The relay lens (RL) 320 serves to place an intermediate image (II) of the panel close to the back of the projection lens (PL) 330, allowing the projection lens 330 to have a very short back focal length. The short back focal length reduces the size of the projection lens 330, and moves the exit pupil (EP) of the projection lens 330 closer to the anamorphic attachment 310. This allows the anamorphic attachment 310 to be compacted in size vertically and horizontally. As an example, a projection lens 330 with an exit pupil EP 50 mm or less from the vertex of the last projection lens element (closest to the screen) would create a compact and realizable system.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. An optical apparatus for converting a camera or projector to a stereoscopic image capture or projection system, the apparatus comprising:
    an anamorphic afocal converter configured to halve a field of view of a camera or projector into two optical paths, and convert the halved fields of view into two full fields of view of the camera or projector;
    a plurality of reflecting elements cooperatively arranged to direct two rectified images at a camera sensor or projection screen, wherein one or more of the plurality of reflecting elements receive the first of the two full fields of view and one or more of the plurality of reflecting elements receive the second of the two full fields of view, and wherein the anamorphic afocal converter is located between the camera or projector and the plurality of reflecting elements; and
    a weak afocal converter inserted in one optical path to correct magnification differences in the images produced by the two fields of view, wherein the optical path lengths for the two optical paths are unmatched.

2. The optical apparatus of claim 1, wherein the anamorphic afocal converter comprises first and second lenses configured to reduce axial, lateral and chromatic aberrations of a lens of the camera or projector.

3. The optical apparatus of claim 2, wherein the first and second lenses comprise convex and concave lens, respectively, implemented as cylindrical doublets.

4. The optical apparatus of claim 2, wherein the anamorphic afocal converter further comprises a prism between the first and second lenses, and operable to redirect the axial rays of the two optical paths to be substantially parallel to the optical axis of the camera or projector.

5. The optical apparatus of claim 1, wherein the reflecting elements comprise three reflecting elements.

6. The optical apparatus of claim 1, wherein the reflecting elements comprise mirrors or total internal reflection prisms.

7. The optical apparatus of claim 1, further comprising first and second filters inserted into each optical path for encoding left and right eye stereoscopic images, wherein the filter functions are orthogonal to one another and the filter locations are selected such that each filter only sees one pass of light from one of the optical paths.

8. The optical apparatus of claim 1, wherein at least one reflecting element is tiltable to overlay the rectified images on a projection screen at a finite distance from the projector.

9. The optical apparatus of claim 1, wherein the optical path lengths for the two optical paths are matched.

10. The optical apparatus of claim 1, further comprising a relay lens and a short back focal length projection lens having an exit pupil proximate to the anamorphic afocal converter.

11. A method for converting a camera or projector to a stereoscopic image capture or projection system, the method comprising:
    halving a field of view of a camera or projector into two optical paths;
    converting the halved fields of view into two full fields of view of the camera or projector;
    directing two rectified images at a camera sensor or projection screen using a plurality of reflecting elements, wherein one or more of the plurality of reflecting elements receive the first of the two full fields of view and one or more of the plurality of reflecting elements receive the second of the two full fields of view; and
    correcting magnification differences in the images produced by the two fields of view, wherein the optical path lengths for the two optical paths are unmatched.

12. The method of claim 11, further comprising redirecting the axial rays of the two optical paths to be substantially parallel to the optical axis of the camera or projector.

13. The method of claim 11, wherein the reflecting elements comprise three reflecting elements.

14. The method of claim 11, wherein the reflecting elements comprise mirrors or total internal reflection prisms.

15. The method of claim 11, further comprising inserting first and second filters into each optical path for encoding left and right eye stereoscopic images, wherein the filter functions are orthogonal to one another and the filter locations are selected such that each filter only sees one pass of light from one of the optical paths.

16. The method of claim 11, further comprising tilting at least one reflecting elements to overlay the rectified images on a projection screen at a finite distance from the projector.

17. The method of claim 11, wherein the optical path lengths for the two optical paths are matched.

18. An optical apparatus for converting a camera or projector to a stereoscopic image capture or projection system, the apparatus comprising:

an anamorphic afocal converter configured to halve a field of view of a camera or projector into two optical paths, and convert the halved fields of view into two full fields of view of the camera or projector, the anamorphic afocal converter further comprising a prism operable to redirect the axial rays of the two optical paths to be substantially parallel to the optical axis of the camera or projector;

three reflecting elements cooperatively arranged to direct two rectified images at a camera sensor or projection screen, wherein one or more of the plurality of reflecting elements receive the first of the two full fields of view and one or more of the plurality of reflecting elements receive the second of the two full fields of view, and wherein the anamorphic afocal converter is located between the camera or projector and the plurality of reflecting elements; and a relay lens and a short back focal length projection lens having an exit pupil proximate to the anamorphic afocal converter.

19. The optical apparatus of claim 18, wherein the anamorphic afocal converter comprises first and second lenses configured to reduce axial, lateral and chromatic aberrations of a lens of the camera or projector.

20. The optical apparatus of claim 19, wherein the first and second lenses comprise convex and concave lens, respectively, implemented as cylindrical doublets.

21. The optical apparatus of claim 18, wherein the anamorphic afocal converter further comprises a prism between the first and second lenses, and operable to redirect the axial rays of the two optical paths to be substantially parallel to the optical axis of the camera or projector.

22. The optical apparatus of claim 18, further comprising first and second filters inserted into each optical path for encoding left and right eye stereoscopic images, wherein the filter functions are orthogonal to one another and the filter locations are selected such that each filter only sees one pass of light from one of the optical paths.

* * * * *